US009191835B2

(12) United States Patent
Guan et al.

(10) Patent No.: US 9,191,835 B2
(45) Date of Patent: Nov. 17, 2015

(54) METHOD AND APPARATUS FOR TRACKING AREA PLANNING AND OPTIMIZATION IN A WIRELESS NETWORK

(71) Applicant: AT&T Intellectual Property I, L.P., Atlanta, GA (US)

(72) Inventors: Sichong Guan, Alpharetta, GA (US); Farhan Mir, Montville, NJ (US); Raghvendra Savoor, Walnut Creek, CA (US); Wei Yuan, Plano, TX (US); Wenjie Zhao, Princeton, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 168 days.

(21) Appl. No.: 14/092,855

(22) Filed: Nov. 27, 2013

(65) Prior Publication Data

US 2015/0146566 A1    May 28, 2015

(51) Int. Cl.
*H04W 4/02*    (2009.01)
*H04W 24/02*    (2009.01)

(52) U.S. Cl.
CPC .............. *H04W 24/02* (2013.01); *H04W 4/021* (2013.01); *H04W 4/028* (2013.01)

(58) Field of Classification Search
CPC ............................ H04W 4/028; H04W 4/021
See application file for complete search history.

(56) References Cited

U.S. PATENT DOCUMENTS

| 8,175,619 | B2 | 5/2012 | Filizola et al. |
| 8,275,392 | B2 | 9/2012 | Iwamura et al. |
| 2011/0306363 | A1 | 12/2011 | Wang et al. |
| 2013/0095862 | A1 | 4/2013 | Bejerano et al. |
| 2013/0288634 | A1 | 10/2013 | Maganti et al. |
| 2015/0163637 | A1* | 6/2015 | Castmo ................. H04W 4/028 |

OTHER PUBLICATIONS

Modarres Razavi, Sara. *Tracking Area Planning in Cellular Networks: Optimization and Performance Evaluation.* Diss. Linköping, 2011.

* cited by examiner

*Primary Examiner* — John Blanton

(57) ABSTRACT

A method, computer-readable storage device and an apparatus for planning tracking areas in a wireless network are disclosed. For example, the method represents geographical neighbor relations between each pair of base stations in a first set, and represents in a third set a plurality of potential assignment options for each base station of the first set to tracking areas in a second set, represents the historical data on paging traffic among the base stations in the first set via a first parameter, and represents the historical data on tracking area update traffic among the tracking areas of the second set via a second parameter, and determines for each base station in the first set, the optimal assignment of a tracking area in the second set.

20 Claims, 3 Drawing Sheets

METHOD AND APPARATUS FOR TRACKING AREA PLANNING AND OPTIMIZATION IN A WIRELESS NETWORK

BACKGROUND

A customer's ability to access wireless services that are provided by a network service provider, e.g., a wireless service provider, is dependent on the availability of capacity in the wireless network. The wireless service is provided to customers via various types of network elements, e.g., cell site equipment, core network equipment, and so on. The service provider needs to perform capacity planning for the various types of network elements.

However, the capacity planning requires consideration of many factors such as throughput, cost, ease in performing handovers, ease in tracking and paging of user endpoint devices, signaling overhead, etc. One approach for planning the capacity is manually manipulating parameters associated with each relevant factor until an experienced planner deems the result satisfactory. Unfortunately, this manual approach is labor intensive and highly non-optimal for capacity planning of large networks.

SUMMARY OF THE DISCLOSURE

In one embodiment, the present disclosure describes a method, computer-readable storage device and an apparatus for tracking area in a wireless network, e.g., in a long term evolution (LTE) based wireless network. For example, the method obtains a list of base stations, a list of tracking areas, historical data on paging traffic and historical data on tracking area update traffic, represents the list of base stations in a first set and the list of tracking areas in a second set, represents geographical neighbor relations between each pair of base stations in the first set, and represents in a third set a plurality of potential assignment options for each base station of the first set to tracking areas in the second set, represents the historical data on paging traffic among the base stations in the first set via a first parameter, and represents the historical data on tracking area update traffic among the tracking areas of the second set via a second parameter and determines for each base station in the first set, the optimal assignment of a tracking area in the second set, in accordance with the first and the second parameters, wherein the optimal assignment for a particular base station assigns a tracking area from among the plurality of potential assignment options in the third set.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure relates generally to wireless networks and, more particularly, to a method, computer-readable storage device and apparatus for tracking area planning and optimization in a wireless network, e.g., a long term evolution (LTE) based wireless network, across a geographical area. Although the teachings of the present disclosure are discussed below in the context of a long term evolution (LTE) based wireless network, the teaching is not so limited. Namely, the teachings of the present disclosure can be applied for other types of wireless networks (e.g., 2G network, 3G network and the like), wherein the user endpoint devices are mobile and are to be tracked and paged for their locations.

Broadly defined, 3GPP is a global effort to define a wireless communication system specification. 2G is a second generation cellular network technology, 3G is a third generation cellular network technology, and 4G is a fourth generation cellular network technology. A Global System for Mobile (GSM) communications is an example of a 2G cellular technology and a Universal Mobile Telecommunications System (UMTS) is an example of a 3G cellular network technology. In accordance with the 3GPP global effort, a General Packet Radio Service (GPRS) refers to a communications service used to transfer data via a cellular network. GPRS is available to users of a 2G cellular system GSM. The GPRS provides an enhancement to the GSM system so that data packets are supported. In addition, in 3GPP release 8, an LTE is provided as a set of enhancements to the UMTS. The enhancement focuses on adopting 4th Generation (4G) mobile communications technology to include an all Internet Protocol (IP) end-to-end networking architecture. An LTE is an example of a 4G cellular network technology.

A base station for a 2G network is also referred to as a base transceiver station (BTS). A base station in a 3G network is also referred to as a Node B. For the 4G network, a radio base transceiver station (RBS), as per the 3GPP standards, is referred to as an eNodeB (or simply as a base station). An eNodeB provides an LTE—air interface and performs radio resource management for wireless access.

In one embodiment, a Serving GPRS Support Node (SGSN) refers to a core network node responsible for mobility management and routing of data calls from/to base stations. For example, the SGSN may send and receive data packets to and from user endpoint devices via RNCs and Node Bs in the coverage area of the SGSN.

In one embodiment, a Gateway GPRS Support Node (GGSN) refers to a network node responsible for the interworking between the GPRS network and external packet switched networks, e.g., the Internet. For example, the GPRS packet may be converted to an Internet Protocol packet prior to being sent to the external network, which is Internet Protocol based.

Figure 1:
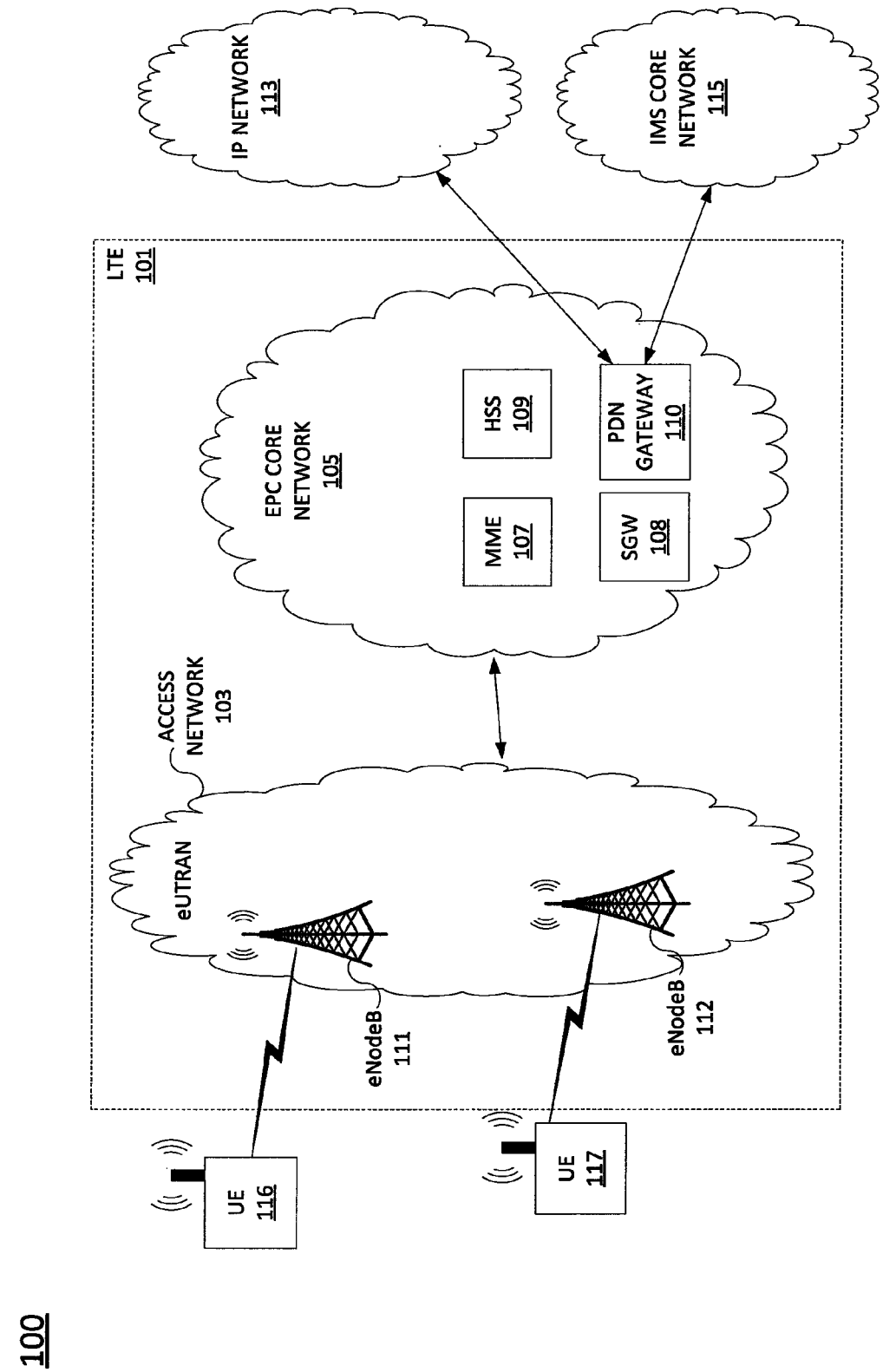
FIG. 1 illustrates an exemplary network related to the present disclosure.

FIG. 1 illustrates an exemplary network 100 related to the present disclosure. In one illustrative embodiment, the network 100 comprises an LTE network 101, an IP network 113, and a core network, e.g., an IP Multimedia Subsystem (IMS) core network 115. FIG. 1 also illustrates various user endpoint devices, e.g., LTE user endpoint devices 116 and 117. The user endpoint devices 116 and 117 can be a smart phone, a cellular phone, a computer or laptop, a computing tablet, or any endpoint communication devices equipped with wireless capabilities.

In one illustrative embodiment, the LTE network 101 comprises an access network 103 and a core network 105. In one example, the access network 103 comprises an evolved Universal Terrestrial Radio Access Network (eUTRAN). In one example, the core network 105 comprises an Evolved Packet Core (EPC) network.

The eUTRANs are the air interfaces of the 3GPP's LTE specifications for mobile networks. Namely, the eUTRAN comprises a radio access network standard that will replace previous generations of air interface standards. All eNodeBs in the eUTRAN 103 are in communication with the EPC network 105. In operation, LTE user equipment or user endpoints (UE) 116 may access wireless services via the eNodeB 111 and the LTE UE 117 may access wireless services via the eNodeB 112 located in the eUTRAN 103.

It should be noted that any number of eNodeBs can be deployed in an eUTRAN. In one illustrative example, the eUTRAN 103 may comprise one or more eNodeBs.

An EPC network provides various functions that support wireless services in the LTE environment. In one embodiment, an EPC network is an Internet Protocol (IP) packet core network that supports both real-time and non-real-time service delivery across a LTE network, e.g., as specified by the 3GPP standards.

In EPC network 105, network devices Mobility Management Entity (MME) 107 and Serving Gateway (SGW) 108 support various functions as part of the LTE network 101. For example, MME 107 is the control node for the LTE access-network. In one embodiment, it is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as the mobility anchor for the user plane during inter-eNodeB handovers and as the anchor for mobility between LTE and other wireless technologies, such as 2G and 3G wireless networks.

In addition, EPC (common backbone) network 105 may comprise a Home Subscriber Server (HSS) 109 that contains subscription-related information (e.g., subscriber profiles), performs authentication and authorization of a wireless service user, and provides information about the subscriber's location. The EPC network 105 may also comprise a public data network (PDN) gateway 110 which serves as a gateway that provides access between the EPC network 105 and various data networks, e.g., other IP networks 113, an IMS core network 115, and the like. The public data network gateway is also referred to as a PDN gateway, a PDN GW or a PGW.

It should be noted that although various networks are shown as separate networks in FIG. 1, it is possible that functions performed by these networks can be combined into fewer networks or expanded into a greater number of networks depending on the deployment requirements.

It should also be noted that the above illustrated network 100 is only illustrative and the number of network components or elements are not specifically limited as shown. In other words, any number of network components or elements can be deployed.

As described above, the MME 107 is the control node for the LTE access-networks and is responsible for UE tracking and paging. In order to page the UE when a call intended for the UE is received, the MME keeps a record of a tracking area in which the UE is registered. The Tracking Area (TA) refers to a geographical area which includes or is defined by a cluster of base stations (e.g., eNodeBs). For example, a TA may comprise n eNodeBs, wherein n may vary based on the design of the LTE network. For example, n may be any positive integer. The cluster of eNodeBs within a particular TA is assigned a particular Tracking Area Code (TAC).

When a connection request intended for a particular UE is received, the MME pages the UE, by broadcasting the paging message to all eNodeBs associated with a particular TA, wherein the UE is currently registered with the particular TA. For example, the paging message may be broadcasted to eNodeBs with the same TAC. The UE may move within the particular TA in which the UE is registered without triggering a Tracking Area Update (TAU). If the UE moves into an eNodeB under a different TA, a TAU signaling message is sent to the MME. The TAU signaling message is then received and processed by the MME to mark the UE's TA as the new TA.

As described above, the MME processes both the signaling messages for paging and the signaling messages for the TAUs. Therefore, there is MME processing cost associated with both types of signaling messages. One approach to reduce the overall processing cost is to reduce the cost associated with processing the signaling messages for paging by reducing the sizes of the TAs. Reducing the size of the TA enables the paging to be broadcasted to fewer eNodeBs. However, if the tracking areas are too small, it is more likely for a UE to cross tracking area borders so that tracking area updates will be triggered frequently. The frequent updating of the tracking areas has several disadvantages as well. First, processing of the TAUs increases the processing load on the MME. Second, the UE, that sends the signaling messages associated with the TAUs to the MME, consumes energy and frequent processing may drain the battery of the UE. Third, during the updating of the tracking area, the UE is unable to respond to the paging, thereby reducing the rate of success of the paging.

Another approach to reduce the overall processing cost is to reduce the cost associated with processing the signaling messages associated with TAUs by increasing the sizes of the TAs. Increasing the sizes of the TAs reduces the frequency of TAUs. However, since each TA now comprises a larger number of eNodeBs, the paging of the UE is broadcasted to a larger number of eNodeBs. Thus, the cost for processing the signaling messages for paging increases for the MME. In addition, all of the eNodeBs in the TA need to process the paging message, even though only one of the eNodeBs in the TA eventually serves the UE.

Another approach to reduce the overall processing cost is to have a network planner manually try to determine a heuristic design of tracking areas. However, a manual operation is not feasible for large areas. The network planner may divide the large area into a large number of smaller areas comprising a smaller number of eNodeBs. For example, the smaller area may comprise less than 50 eNodeBs. The network planner may then determine an acceptable design for the smaller area. However, since the heuristic design is based on a local view of each smaller area, the design for the large area would not be optimal.

In one embodiment, the present disclosure provides a method that optimizes the size of the TAs, such that the overall processing cost of all signaling messages is minimized. The method first defines an objective function for minimizing the overall overhead cost on an MME, i.e., balancing the overhead cost associated with the TAU against the overhead cost associated with the paging. The method optimizes the planning of tracking areas via an Integer Quadratic Programming (IQP) mathematical model. The objective function may be represented mathematically as follows:

First, the method obtains a list of eNodeBs and a list of tracking areas. Then the list of eNodeBs and the list of tracking areas can be represented by a set $C=\{1, \ldots, N\}$, and a set $TA=\{1, \ldots, M\}$, respectively.

Then, let a set NBR represent geographical neighbor relations between eNodeBs in the set C. In addition, let a two dimensional set COMB represent potential assignment options from each eNodeB to a TA. For a particular eNodeB, the set COMB comprises: the current TA to which the eNodeB is assigned, and all TAs to which at least one of the particular eNodeBs neighbors is assigned.

Then, a parameter p is defined on the set $C=\{1, \ldots, N\}$ to capture a historical statistics of paging traffic among the members of the set $C=\{1, \ldots, N\}$. Similarly, a parameter t is defined on each NBR to capture a historical statistic of traffic due to TAUs.

Then, the method defines a binary decision variable X[i,t] to describe an assignment decision, such that:

$$X[i, t] = \begin{cases} 1, & \text{if } eNodeB \ i \text{ is assigned to } Tat \\ 0, & \text{Otherwise} \end{cases}.$$

Then, the method defines a binary decision variable Y[i,j,t] to construct a mechanism to describe the TAU, such that:

$$Y[i, j, t] = \begin{cases} 1, & \text{if } eNodeB \ i \text{ and } j \text{ is assigned to } TAt \\ 0, & \text{Otherwise} \end{cases}.$$

Then, the objective function may be represented as:

$$\text{Min} \sum_{t \in TA} \left\{ \begin{array}{l} Cost_{TAU} \sum_{\substack{(i,t) \in COMB \\ (j,t) \in COMB}} t(i, j)(1 - Y[i, j, t]) + \\ Cost_{paging} \left( \sum_{(i,t) \in COMB} X[i, t] \right) \left( \sum_{(i,t) \in COMB} X[i, t]p(i) \right) \end{array} \right\} \quad (1)$$

The first term of the objective function (1) addresses the cost of the TAUs on the MME. If Y[i,j,t]=1, then eNodeBs i and j are assigned to a same TA and there is no cost associated with TAUs. Otherwise, the cost associated with TAUs between eNodeBs i and j is equal to t(i,j). The goal of the inclusion of the first term in the model is to assign pairs of eNodeBs i and j with a large value of t(i,j) to a same TA.

The second term of the objective function (1) addresses the cost associated with paging on MME. The second term of the objective function (1) is a non-symmetrical quadratic term that comprises two parts. The first part is to quantify the total number of eNodeBs to include in a TA, and the second part is to quantify the total number of paging signals the MME sends out if these eNodeBs are included in the TA.

In one embodiment, the method assumes that the paging traffic is distributed evenly at each eNodeB. Then, an average number of paging traffic may be determined and represented by $P_{avg}$. Then, the second term of the objective function (1) becomes:

$$Cost_{paging} P_{ave}(\Sigma_{(i,t) \in COMB} X[i,t])(\Sigma_{(i,t) \in COMB} X[i,t]).$$

The second term of the objective function (1) may then be represented as a symmetrical quadratic function of X[i,t] that balances the size of the TAs. In a preferred embodiment, the present disclosure assumes that the paging traffic is distributed evenly at each eNodeB, and uses the above symmetrical quadratic function in the second term of the objective function (1).

Then, the method determines the optimal solution of the objection function subject to one or more constraints. As described above, the first term of the objective function addresses the cost associated with TAUs. In order to achieve the desired goal, a first constraint is defined for a mechanism that pushes pairs of eNodeBs that historically have a high degree of TAUs between them into a same tracking area is used. The method first defines a geographical neighbor relation between each pair of eNodeBs. The neighbor relation may be represented as NBR. If two eNodeBs are geographical neighbors, the eNodeBs tend to have more traffic between them. Then, if the two eNodeBs are assigned to two different TAs, there may be a high degree of tracking area updates between the two TAs. The method then defines a two binary variable structure. The two binary variable structure is represented mathematically as follows:

$$2Y[i,j,t] \le X[i,t] + X[j,t], \text{ for}$$

$$\forall (i,j) \in NBR, t \in TA, (i,t) \in COMB, \text{ and } (j,t) \in COMB. \quad (2)$$

X and Y are binary variables in the inequality (2). That means, the binary variable Y[i,j,t]=1, only when both eNodeBs i and j are assigned to a same TA t. When the binary variable Y[i,j,t]=1, according to the first term in objective function (1), there is no TAU cost. Thus, the objective function working with the constraint in (2) pushes all pairs of eNodeBs, with large TAUs in between, to be assigned to a same TA.

A second constraint is defined based on an assumption that each eNodeB is assigned only to one TA. The constraint may be referred to as a unique assignment constraint. For example, each eNodeB is to be assigned to one and only one TA. Mathematically, the second constraint may be represented as:

$$\text{For } \forall i \in C, \Sigma_{t \in TA} X[i,t]=1. \quad (3)$$

A third constraint is defined to ensure that the optimal solution does not impose unattainable requirement on the eNodeB processor and air link constraints at the site. For example, the eNodeB processes the signaling messages for paging. Thus, the capacity of the eNodeB is clearly bounded.

Mathematically defined, if $Cost_p$ represents the paging cost of an eNodeB, and $CAP_p(i)$ represents the paging capacity of eNodeB i, and BigM is a large number, the third constraint may be represented as follows:

$$\text{For } \forall \ i \in C, t \in TA, (i, t) \in COMB \quad (4)$$

$$Cost_p\{p(i)X[i, t] + \sum_{\substack{(j,t) \in COMB \\ j \ne i}} p(j)X[j, t]\} \le$$

$$CAP_p(i) + (1 - X[i, t]) * BigM.$$

The first term on the left hand side of the inequality (4) is for paging overhead signaled by eNodeB i. The second term is the summation of all paging traffic signaled by all other eNodeBs which are assigned to the same TA. The paging overhead at eNodeB i is also dependent on the size of the TA. The right hand side of the inequality (4) becomes equal to $CAP_p(i)$ when X[i,t]=1. This occurs only when eNodeB i is assigned to a TA t. Thus, when eNodeB i is assigned to a TA t, the constraint (4) is applicable. Otherwise, the BigM is designed so large such that the inequality (4) becomes trivial.

In one embodiment, the $CAP_p(i)$ encompasses not just limits on eNodeB processing capacity of the paging traffic but also limits on the capacity of physical channels for air link, e.g. physical downlink control channel (PDCCH) and physical downlink shared channel (PDSCH), as well as limits on paging occasion. In one embodiment, the $CAP_p(i)$ is determined as a minimum of the eNodeB paging processing capacity, the capacity of air link channels, and the paging occasion limits with required the blocking probability.

A fourth constraint is defined to ensure the re-homing plan of eNodeBs to TAs is feasible. For example, there may be limitation on the number of re-homings due to budgetary, labor or time constraints. In addition, re-homing of an eNodeB may require tearing down a current configuration, thereby causing a service interruption. The present method provides the fourth constraint as a means to quantify and limit the re-homing such that the optimal solution is practical. The fourth constraint is defined mathematically as follows:

The method defines a binary parameter S(i, t) to record a current eNodeB to a TA assignment.

$$S(i, t) = \begin{cases} 1, & \text{if } eNodeN \ i \text{ is currently not assigned to } TAt \\ 0, & \text{Otherwise} \end{cases}.$$

Then, $$X[i, t]S(i, t) = \begin{cases} 1, & \text{if } eNodeB \ i \text{ is re-homing to } TAt \\ 0, & \text{Otherwise} \end{cases}.$$

The fourth constrain may then be represented as follows:

$$\Sigma_{t \in TA} \Sigma_{(i,l) \in COMB} X[i,t] S(i,t) \leq \text{Budget}. \quad (5)$$

In one embodiment, the budget in equation (5) may be based on a time limit, a labor limit, a financial limit, a limit on a number of re-homings, or a combination thereof.

The method then optimizes the objective function (1) subject to the above constraints to provide an optimal TA assignment for each of the enodebs in the set C={1, ..., N} to a TA in the set TA={1, ..., M}.

Figure 2:
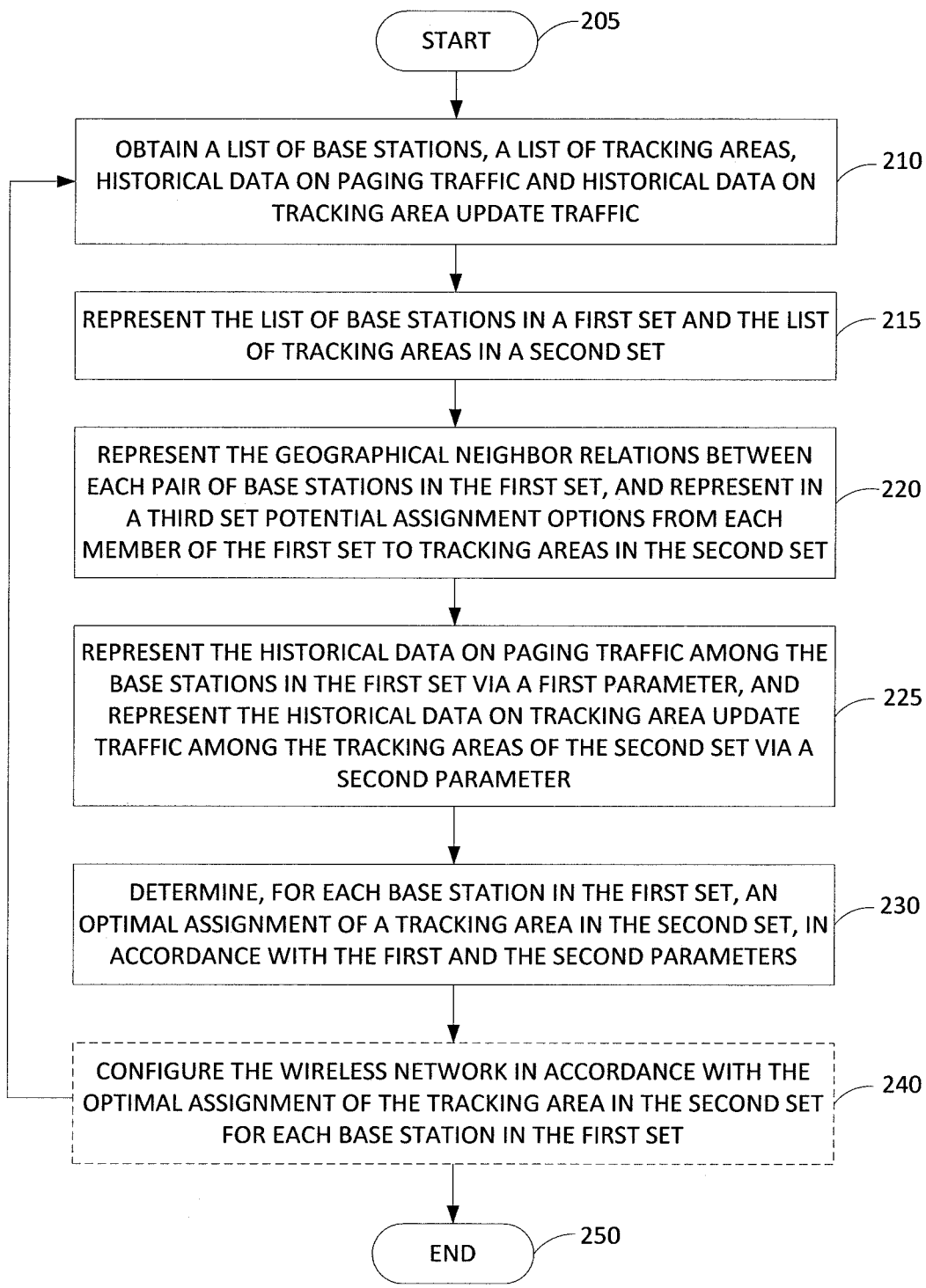
FIG. 2, illustrates a flowchart of a method for planning tracking areas in a wireless network.

FIG. 2, illustrates a flowchart of a method 200 for planning tracking areas in a wireless network. In one embodiment, the method may be implemented in a server, e.g., a network planning application server or the general purpose computer of FIG. 3 discussed below. Method 200 starts in step 205 and proceeds to step 210.

In step 210, method 200 obtains a list of base stations, e.g., eNodeBs, a list of tracking areas, historical data on paging traffic, historical data on tracking area update traffic, etc.

In step 215, method 200 represents the list of base stations in a first set and the list of tracking areas in a second set.

In step 220, method 200 represents geographical neighbor relations between each pair of base stations in the first set, and represents in a third set potential assignment options from each member of the first set to tracking areas in the second set. For example, the method may define a set NBR to represent geographical neighbor relations between base stations. In addition, a two dimensional set COMB may represent potential assignment options from each base stations to each TA. In one embodiment, for a particular base station, the third set represents a set COMB that comprises: the current TA to which the base station is assigned, and all TAs to which at least one of the particular base stations neighbors is assigned.

In step 225, method 200 represents the historical data on paging traffic among the base stations in the first set via a first parameter, and represents the historical data on tracking area update traffic among the tracking areas of the second set via a second parameter. For example, a parameter p (broadly a first parameter) is defined on the set C={1, ..., N} to capture a historical statistics of paging traffic among the members of the set C={1, ..., N}. Similarly, a parameter t (broadly a second parameter) is defined on each NBR to capture a historical statistic of traffic due to TAUs among the tracking areas in the set TA={1, ..., M}.

In step 230, method 200 determines, for each base station in the first set, an optimal assignment of a tracking area in the second set, in accordance with the first and the second parameters. The optimal assignment for a particular base station assigns a tracking area from among the potential assignment options in the third set, as determined in step 220 for the particular base station.

In optional step 240, method 200 configures the wireless network in accordance with the optimal assignment. The method then either proceeds to step 250 to end processing the current list of base stations and tracking areas, or to step 210.

In one embodiment, the optimal assignment is determined for each base station in accordance with an optimization technique that assigns each pair of base stations in the first set with tracking area update traffic of high volume into a same tracking area. For example, pairs of eNodeBs that historically have a high degree of TAUs between them may be assigned to a same tracking area.

In one embodiment, the optimal assignment is determined for each base station such that each base station is assigned only to one tracking area.

In one embodiment, the optimal assignment is determined, for each base station, such that a total of a paging traffic for the base station is less than a predetermined threshold on the paging traffic for the base station. For example, if $Cost_p$ represents the paging cost of an eNodeB, and $CAP_p(i)$ represents the paging capacity of eNodeB i, the assignment of eNodeB i to a TA is performed such that the paging traffic of eNodeB i is below the $CAP_p(i)$ after the assignment of eNodeB i to a particular TA t.

In one embodiment, for a particular base station, the predetermined threshold on the paging traffic comprises a threshold on a paging capacity of the base station.

In one embodiment, for a particular base station, the predetermined threshold on the paging traffic comprises a threshold on an air link of physical channels. In one embodiment, the air link physical channels comprise physical downlink control channels. In one embodiment, the air link physical channels comprise physical downlink shared channels.

In one embodiment, for a particular base station, the predetermined threshold on the paging traffic comprises a threshold on a blocking probability.

In one embodiment, the optimal assignment is determined, for each base station, such that a total number of re-homings of all base stations in the first set are below a threshold on a number of re-homings. In one embodiment, the threshold on the number of re-homings comprises a threshold based on budgetary limitations. In one embodiment, the threshold on the number of re-homings comprises a threshold based on limitations on labor. In one embodiment, the threshold on the number of re-homings comprises a threshold based on time. In one embodiment, the threshold on the number of re-homings comprises a threshold based on a number of service interruptions.

Figure 3:
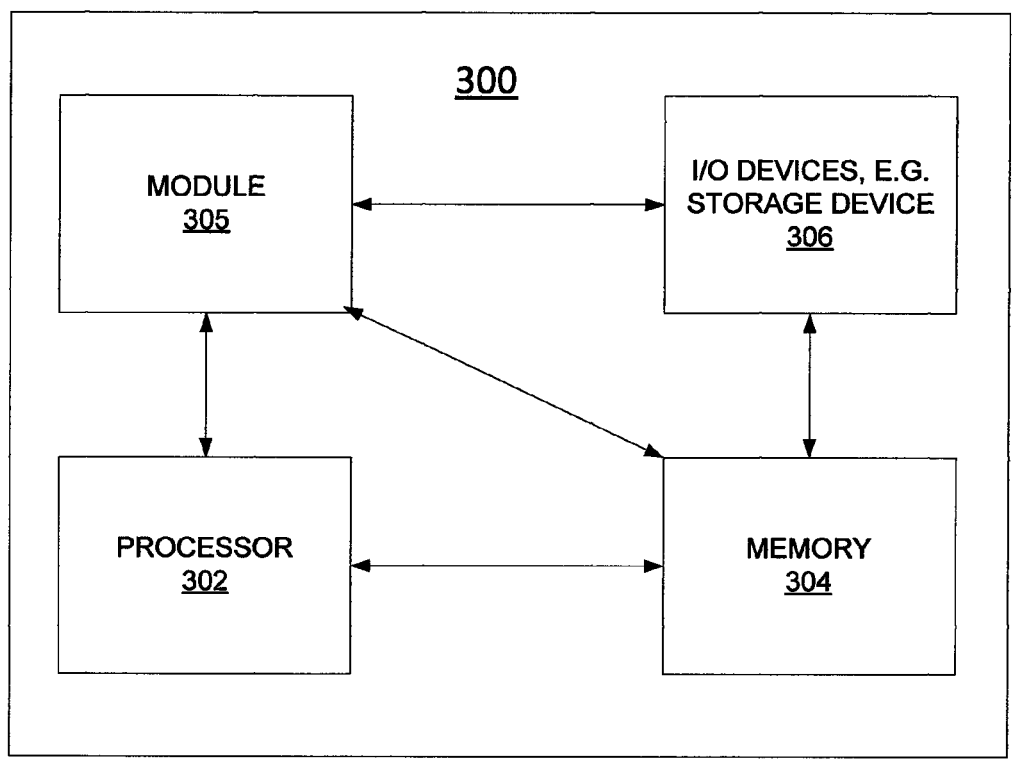
FIG. 3 depicts a high-level block diagram of a general-purpose computer suitable for use in performing the functions described herein.

FIG. 3 depicts a high-level block diagram of a general-purpose computer suitable for use in performing the functions described herein. As depicted in FIG. 3, the system 300 comprises one or more hardware processor elements 302 (e.g., a central processing unit (CPU), a microprocessor, or a multi-core processor), a memory 304, e.g., random access memory (RAM) and/or read only memory (ROM), a module 305 for planning tracking areas in a wireless network, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 305 for planning tracking areas in a wireless network (e.g., a software program comprising computer-executable instructions) can be loaded into memory 304 and executed by hardware processor element 302 to implement the steps, functions or operations as discussed above in connection with the exemplary method 200. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for planning tracking areas in a wireless network (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method for determining an optimal assignment in a wireless network, comprising:
    obtaining, by a processor, a list of base stations, a list of tracking areas, historical data on paging traffic and historical data on tracking area update traffic;
    representing, by the processor, the list of base stations in a first set and the list of tracking areas in a second set;
    representing, by the processor, geographical neighbor relations between each pair of base stations in the first set, and representing in a third set a plurality of potential assignment options for each base station of the first set to tracking areas in the second set;
    representing, by the processor, the historical data on paging traffic among the base stations in the first set via a first parameter, and representing the historical data on tracking area update traffic among the tracking areas of the second set via a second parameter; and
    determining, by the processor, for each base station in the first set, the optimal assignment of a tracking area in the second set, in accordance with the first and the second parameters, wherein the optimal assignment for a particular base station assigns a tracking area from among the plurality of potential assignment options in the third set.

2. The method of claim 1, further comprising:
    configuring the wireless network in accordance with the optimal assignment of the tracking area in the second set for each base station in the first set.

3. The method of claim 1, wherein the optimal assignment is determined for each base station in accordance with an optimization technique that assigns each pair of base stations in the first set with tracking area update traffic of a predetermined volume into a same tracking area.

4. The method of claim 1, wherein the optimal assignment is determined for each base station where each base station is assigned only to one tracking area.

5. The method of claim 1, wherein the optimal assignment is determined, for each base station, where a total of a paging traffic for the base station is less than a predetermined threshold on the paging traffic for the base station.

6. The method of claim 5, wherein each base station is associated with a respective predetermined threshold.

7. The method of claim 5, wherein, for a particular base station, the predetermined threshold on the paging traffic comprises a threshold on an air link of physical channels.

8. The method of claim 7, wherein the air link physical channels comprise physical downlink control channels.

9. The method of claim 7, wherein the air link physical channels comprise physical downlink shared channels.

10. The method of claim 5, wherein, for a particular base station, the predetermined threshold on the paging traffic comprises a threshold on a blocking probability.

11. The method of claim 1, wherein the optimal assignment is determined, for each base station, where a total number of re-homings of all base stations in the first set is below a threshold on a number of re-homings.

12. The method of claim 11, wherein the threshold on the number of re-homings comprises a threshold based on a budgetary limitation.

13. The method of claim 11, wherein the threshold on the number of re-homings comprises a threshold based on a limitation on labor.

14. The method of claim 11, wherein the threshold on the number of re-homings comprises a threshold based on a time limitation.

15. The method of claim 11, wherein the threshold on the number of re-homings comprises a threshold based on a number of service interruptions.

16. The method of claim 1, wherein the wireless network comprises a long term evolution based wireless network.

17. The method of claim 1, wherein the plurality of potential assignment options for a particular base station of the first set comprises a set of tracking areas, wherein the set of tracking areas comprises a tracking area of the set of tracking areas to which the particular base station of the first set is currently assigned, and all tracking areas of the set of tracking areas to which at least one geographical neighbor of the particular base station of the first set is currently assigned.

18. A computer-readable storage device storing a plurality of instructions which, when executed by a processor, cause the processor to perform operations for determining an optimal assignment in a wireless network, the operations comprising:

obtaining a list of base stations, a list of tracking areas, historical data on paging traffic and historical data on tracking area update traffic;

representing the list of base stations in a first set and the list of tracking areas in a second set;

representing geographical neighbor relations between each pair of base stations in the first set, and representing in a third set a plurality of potential assignment options for each base station of the first set to tracking areas in the second set;

representing the historical data on paging traffic among the base stations in the first set via a first parameter, and representing the historical data on tracking area update traffic among the tracking areas of the second set via a second parameter; and determining for each base station in the first set, the optimal assignment of a tracking area in the second set, in accordance with the first and the second parameters, wherein the optimal assignment for a particular base station assigns a tracking area from among the plurality of potential assignment options in the third set.

19. The computer-readable storage device of claim 18, further comprising:

configuring the wireless network in accordance with the optimal assignment of the tracking area in the second set for each base station in the first set.

20. An apparatus for determining an optimal assignment in a wireless network, comprising:

a processor; and a computer-readable storage device storing a plurality of instructions which, when executed by the processor, cause the processor to perform operations, the operations comprising:

obtaining a list of base stations, a list of tracking areas, historical data on paging traffic and historical data on tracking area update traffic;

representing the list of base stations in a first set and the list of tracking areas in a second set;

representing geographical neighbor relations between each pair of base stations in the first set, and representing in a third set a plurality of potential assignment options for each base station of the first set to tracking areas in the second set;

representing the historical data on paging traffic among the base stations in the first set via a first parameter, and representing the historical data on tracking area update traffic among the tracking areas of the second set via a second parameter; and determining for each base station in the first set, the optimal assignment of a tracking area in the second set, in accordance with the first and the second parameters, wherein the optimal assignment for a particular base station assigns a tracking area from among the plurality of potential assignment options in the third set.

* * * * *